United States Patent
Desai et al.

(10) Patent No.: US 8,321,535 B2
(45) Date of Patent: Nov. 27, 2012

(54) WEB SERVICES INTEGRATION SYSTEMS AND METHODS

(75) Inventors: Anish Harshadbhai Desai, Castro Valley, CA (US); Sujith Surendran, Palo Alto, CA (US); Megha Chawla, San Francisco, CA (US); Sureshbabu Chennalath, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1816 days.

(21) Appl. No.: 10/993,893

(22) Filed: Nov. 19, 2004

(65) Prior Publication Data

US 2006/0155817 A1 Jul. 13, 2006

(51) Int. Cl.
G06F 15/177 (2006.01)
G06F 15/16 (2006.01)

(52) U.S. Cl. .......................... 709/220; 709/228; 709/222

(58) Field of Classification Search .................. 709/208, 709/223
See application file for complete search history.

(56) References Cited

U.S. PATENT DOCUMENTS

| | | | |
|---|---|---|---|
| 2003/0055624 A1 | 3/2003 | Fletcher et al. | |
| 2003/0182364 A1 | 9/2003 | Large et al. | |
| 2003/0191769 A1* | 10/2003 | Crisan et al. | 707/100 |
| 2003/0220925 A1 | 11/2003 | Lior | |
| 2004/0003130 A1 | 1/2004 | Becker et al. | |
| 2004/0045004 A1 | 3/2004 | Cheenath | |
| 2004/0068565 A1 | 4/2004 | Polan et al. | |
| 2006/0168115 A1* | 7/2006 | Loupia et al. | 709/218 |
| 2006/0212823 A1* | 9/2006 | Bhagat et al. | 715/783 |
| 2007/0204279 A1* | 8/2007 | Warshavsky et al. | 719/330 |

* cited by examiner

*Primary Examiner* — Benjamin R Bruckart
*Assistant Examiner* — Shripal Khajuria
(74) *Attorney, Agent, or Firm* — Kilpatrick Townsend & Stockton LLP (57) ABSTRACT

Methods, systems, and machine-readable mediums are disclosed to integrate web services with applications. In one embodiment, a method is disclosed which comprises determining an operation provided by a web service, determining an more input parameter associated with the operation, mapping the input parameter to an application input data parameter associated with an application, and storing the mapping in setup information used to invoke the operation. In another embodiment, a method comprises obtaining setup information for an operation associated with a web service, using the setup information to determine mappings between one or more input parameters associated with the operation and application input data parameters, obtaining a value associated with an application input data parameter for each of the application input data parameters mapped to one of the input parameters, and invoking the web service using the obtained values.

16 Claims, 8 Drawing Sheets

WEB SERVICES INTEGRATION SYSTEMS AND METHODS

BACKGROUND

A web service is a collection of one or more operations which are published and made available on the Internet. A description of the public interface to the web service is generally provided in a Web Services Description Language (WSDL) document. In order to invoke an operation associated with a web service, input values must be provided in accordance with the web service description document. These values are typically provided as one or more Extended Markup Language (XML) messages, such as Simple Object Access Protocol (SOAP) messages, sent to the web service. The web service then executes the requested operation and returns one or more output values in one or more XML messages.

Companies that want to use one or more of the operations provided by a web service must integrate the web service with the company's business application(s). The integration must be done by software developers making changes to the application(s). This can be a time consuming and expensive process. The costs, in both time and money, increase with each web service integrated with an application. These costs are not insignificant, as an average size business may need to integrate with hundreds of web services. Additionally, if an integrated web service interface changes, the company may incur additional costs to maintain existing integrations or access new functionality provided by the changed web service.

SUMMARY

Systems, methods, and machine-readable mediums are disclosed to integrate web services with applications. In one embodiment, a method is provided which comprises determining an operation provided by a web service. An input parameter associated with the operation is also determined. The input parameter is mapped to an application input data parameter associated with an application. By way of example, the input parameter may be mapped by displaying the input parameter in a user interface and receiving a selection from the user to associate the input parameter to the application data input parameter. A set of application parameters able to be mapped to the input parameter may also be optionally provided in the user interface. After the input parameter is mapped, the mapping is stored in setup information used to invoke the operation.

The method may further include determining an output parameter associated with the operation. The output parameter is mapped to an application output data parameter associated with the application. The output parameter mapping may be stored in the setup information. Additional associations between parameters used by the web service and application data inputs/outputs may also be stored in the setup information. For example, additional mappings between input parameters and application data input parameters and/or additional mappings between output parameters and application data output parameters may be stored in setup information and used to invoke the web service operation. As another example, mappings may also be stored which map input parameters used by the web service operation to constant values.

In some instances, the operation provided by the web service may be determined by receiving a description of the web service (e.g., a WSDL document). The description may be parsed to determine operations associated with the web service. Optionally the associated operations may be displayed in a user interface and a selection of one of the associated operations may be received from the user.

In a second embodiment, a method is disclosed which comprises receiving a description of a web service. Operations associated with the web service are determined using the description and the operations are displayed in a user interface. A selection of one of the operations is received. One or more input parameters associated with the selected operation are determined. The one or more input parameters are displayed in the user interface. Additionally, a mechanism for a user to view application input data parameters able to be associated to a first one of the input parameters is provided. A selection is received from the user to map the first input parameter to one of the application input data parameters. One or more output parameters associated with the selected operation are also determined. A second mechanism is provided in the user interface for a user to view application output data parameters able to be associated to a first one of the output parameters. A selection from the user to map the first output parameter to one of the application data output parameters is received. The mappings are stored in setup information used to invoke the selected operation.

In a third embodiment, a method is disclosed which comprises obtaining setup information for an operation associated with a web service. The setup information is used to determine mappings between one or more input parameters associated with the operation and application input data parameters. For each of the application input data parameters mapped to one of the input parameters, a value associated with the application input data parameter is obtained. By way of example, an input values may be obtained by receiving a location of a data structure associated with the input data parameter and obtaining the value from the data structure. The web service is then invoked using the obtained values.

The method may further comprise receiving an output from the service. The setup information may be used to determine a mapping from the output to an application output data parameter. The output may then be stored in a data structure (e.g., a field in a database record) associated with the application output data parameter. In some cases, before the output is stored, a value associated with the application output data parameter is received. The value indicates the location of the data structure.

In a fourth embodiment, an apparatus is disclosed which comprises an interface to receive a description of a web service. The apparatus also comprises parsing logic configured to parse the description to determine an operation associated with the web service and to determine input parameters associated with the operation. A user interface is configured to display the input parameters and to receive an association between a first one of the input parameters and an application data input. Mapping logic is configured to map the input parameter to the application data input parameter. The apparatus may further comprise a data storage to store the mapping. The parsing logic may also be configured to determine output parameters associated with the operation; the user interface may be configured to display the output parameters and to receive an association between a first one of the output parameters and an application data output parameter; and the mapping logic may further be configured to map the first output parameter to the application data output parameter.

In some embodiments, the apparatus further includes execution logic. The execution logic is configured to obtain a value associated with the application data input parameter.

The execution logic is also configured to invoke the web service operation using the obtained value.

The methods may also be embodied in at least one machine-readable medium having instructions which execute on the machine. A further understanding of the nature and advantages of the present invention may be realized by reference to the remaining portions of the specification and the drawings.

BRIEF DESCRIPTION OF THE DRAWINGS

Illustrative embodiments in accordance with the invention are illustrated in the drawings in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
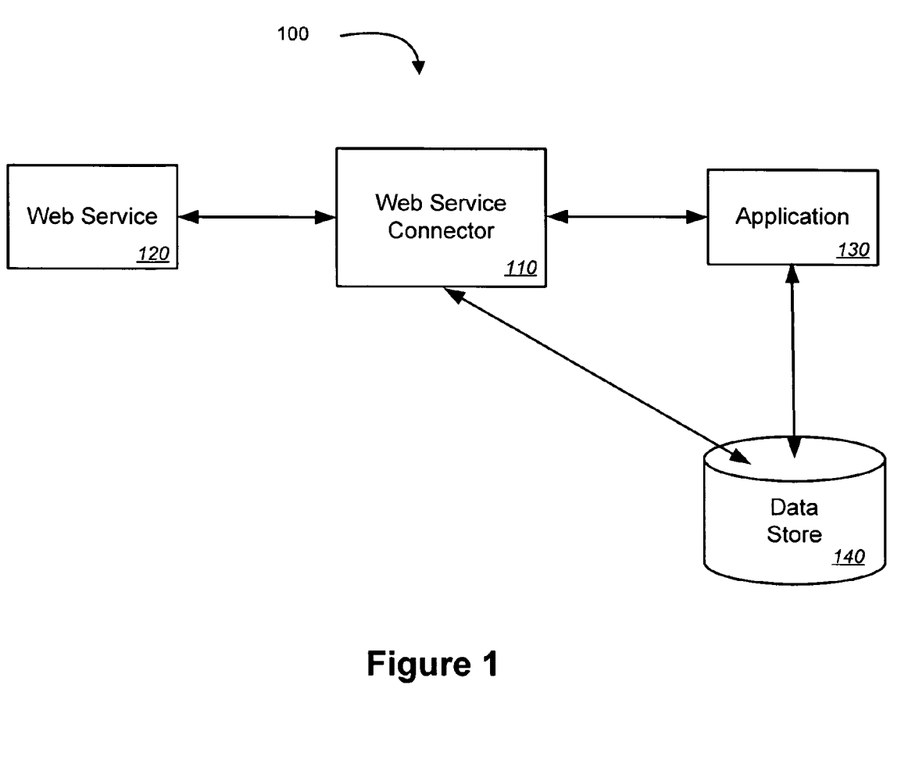
FIG. 1 is a block diagram of a system using a web service connector to integrate an application with a web service.

FIG. 1 is a block diagram illustrating a system that may use a web service connector to integrate an application with a web service. The system 100 includes a web service connector 110. As will be described in further detail below, web service connector 110 may be used to integrate application 130 with web service 120. In one embodiment, web service connector 110 may be program logic, which may be a standalone application program or a component of another application program, such as application 130.

Web service connector 110 is communicatively coupled with web service 120 and application 130. A communicative coupling is a coupling that allows communication between the components. This may be by means of an internal bus or an external communication means, such as a network. Thus, components which are communicatively coupled may be on the same machine or different machines.

Application 130 may be any type of program application that makes use of one or more web services 120. Optionally, application 130 may be communicatively coupled with a data store 140 used to store data for application 130. By way of example data store 140 may be a database (e.g., a relational database or object database), XML schema, text file, internal software structure, or other type of data structure. Web service connector 110 may also be communicatively coupled with the data store 140 to store and retrieve application data. In some embodiments, application 130 may use web service connector 110 to setup the integration of application 130 with web service 120 and to invoke one or more operations provided by web service 120. In alternate embodiments, application 130 may use web service connector 110 to create setup information, which may then be used by application 130 to invoke a web service operation.

Web service 120 is a collection of one or more operations which are made available on the Internet or other network. By way of example, web service 120 may be identified by a Uniform Resource Locator (URL) and communications with web service 120 may use XML, or a subset of XML, SOAP (Simple Object Access Protocol) messages, or other type of communication protocol. A description of the public interface to web service 120 may be made available by a WSDL document, XML, or other type of suitable data exchange that may be used to provide the public interface of web service 120.

Although FIG. 1 illustrates an embodiment with one web service 120, any number of additional web services may also be integrated with application 130 using web service connector 110. Additionally, any number of applications 130 may use web service connector 110 to integrate with web service 120 and/or other web services.

Figure 2:
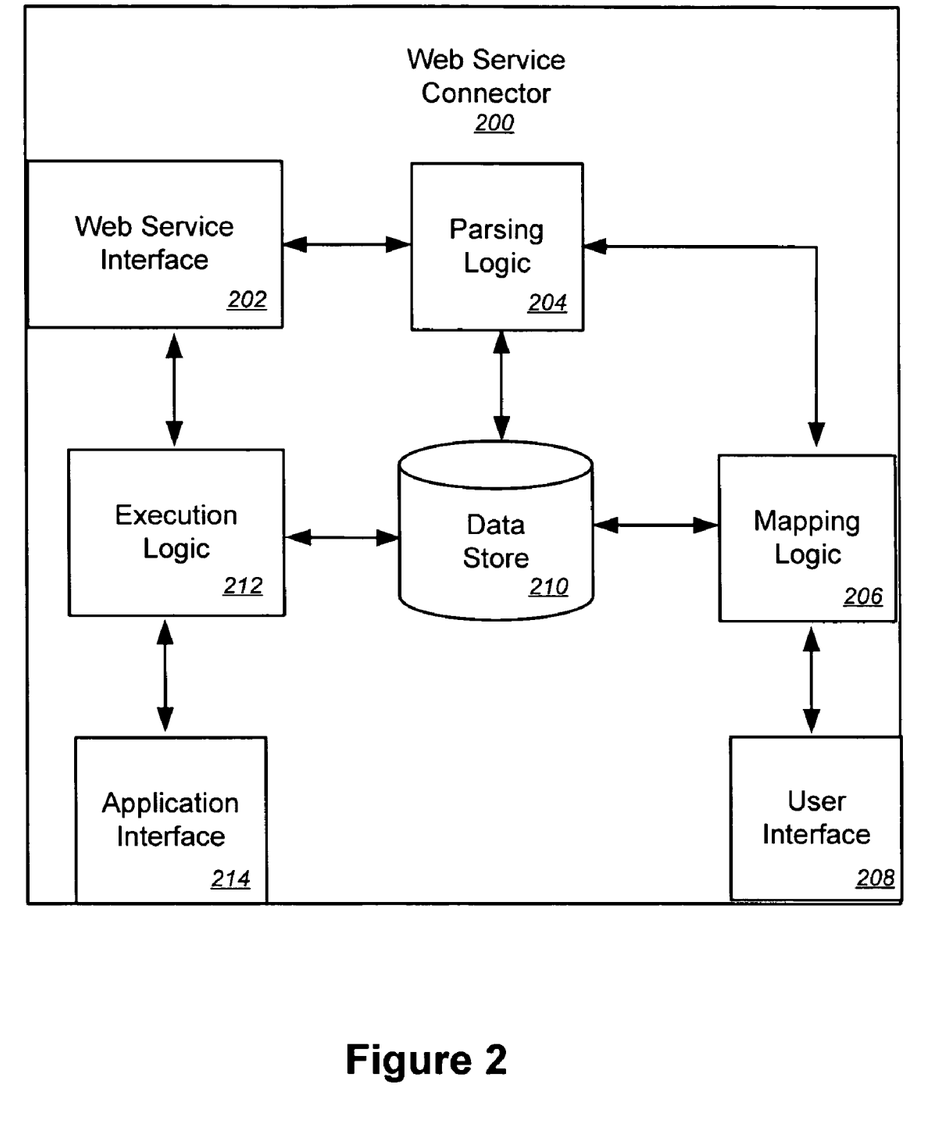
FIG. 2 is an exemplary block diagram of components of a web service connector.

In some embodiments, a web service connector may include a variety of components or modules. FIG. 2 illustrates one exemplary configuration of a web service connector 200. In this embodiment, web service connector 200 includes web service interface 202, parsing logic 204, mapping logic 206, user interface 208, data store 210, execution logic 212, and application interface 214.

Web service interface 202 may be used to obtain a description of a web service, such as a WSDL document. Web service interface 202 may be an Internet interface or other type of interface to communicate with one or more web services.

The description of the web service is parsed by parsing logic 204 to determine operations associated with the web service. Parsing logic 204 may also be used to obtain input parameters that may be sent to web service to invoke an operation provided by the web service and output parameters that are returned by the web service as a result of an invocation of an operation. Parsing logic 204 may include a WSDL parser, a dynamic invocation library, an XML document parser, or other type of suitable parser to parse the description to determine operations provided by a web service and input/output parameters associated with the web service or operation provided by the web service.

In some instances, the web service may use XML schemas to describe complex parameters. XML schemas may also be programmatically analyzed by parsing logic 204. Parsing logic 204 may identify all the elements (simple types, complex types, and extensions) that make up an XML schema. Elements that can occur multiple types, such as SOAP arrays, may also be identified. Parsing logic 204 may also be able to handle literal, encoded, and Remote Procedure Calls (RPC) included in the web service interface.

Parsing logic 204 may then store the input/output parameters described in the web service description in one or more data structures that generically represent message parts described in the web service description. By way of example, the data structure may be a tree-like data structure having individual elements for each of the web service parameters. The data structure may be stored in data store 210, which may be a database, text file, internal software structure, or other suitable data structure. In some instances, data store 210 may be shared by one or more applications using the data store to store application data. Alternatively, parsing logic may not store the information but may instead send the information to mapping logic 206 for further processing.

Mapping logic 206 may obtain the operations provided by the web service from data store 210 or parsing logic 204. These operations may be then be sent to a user interface 208 (e.g., a graphical user interface (GUI) for presentation to a user. As will be described in further detail below, the user may then use the user interface 208 to select one or more operations to configure and to associate the web service parameters obtained by parsing logic 204 to application data parameters. Mapping logic 206 may map the parameters in accordance with the user selections. These mappings may then be stored in setup information used to invoke an operation associated with the web service. Although FIG. 2 illustrates mapping logic 206 using the same data store 210 as parsing logic 204, in alternative embodiments a different data store may be used to store the mappings between web service parameters and application data parameters.

In some embodiments, web service connector 200 may further include an application interface 214 and execution logic 212 to invoke a web service operation on behalf of an application. An application may send a request to invoke a web service operation to application interface 214. The application may also transmit a setup identifier identifying the setup information to be used for the invocation or execution logic 212 may determine the setup information to use based on the application requesting the invocation and the particular web service operation being invoked.

Execution logic 212 may retrieve the setup information and use the setup information to determine application data parameters mapped to web services parameters. The location of the values for the application data parameters may be sent by the application. By way of example, the location may be a field in a database record or a pointer to a memory location. Alternatively, the application may send the values of the application data parameters to the web service connector 200. Execution logic 212 may then invoke the web service using the obtained values. In one embodiment, execution logic 212 creates one or more SOAP messages that includes the data values as XML message parts. In some cases, at least a portion of the data retrieved from the web service may be stored as determined by the setup information (e.g., stored in database fields mapped to the web services outputs).

In some embodiments, execution logic 212 may determine that the application data inputs includes more data that can be processed by the web service operation in a single execution. In these embodiments, execution logic 212 may divide the input data into sets. Each data set may then be processed by a single execution of the web service.

It should be appreciated that in alternative embodiments, web service connector 200 may include additional or fewer components than illustrated in FIG. 2. For example, in some embodiments, web service connector 200 may not include execution logic 212. Additionally, the functionality may be performed by different components than described.

Figure 3:
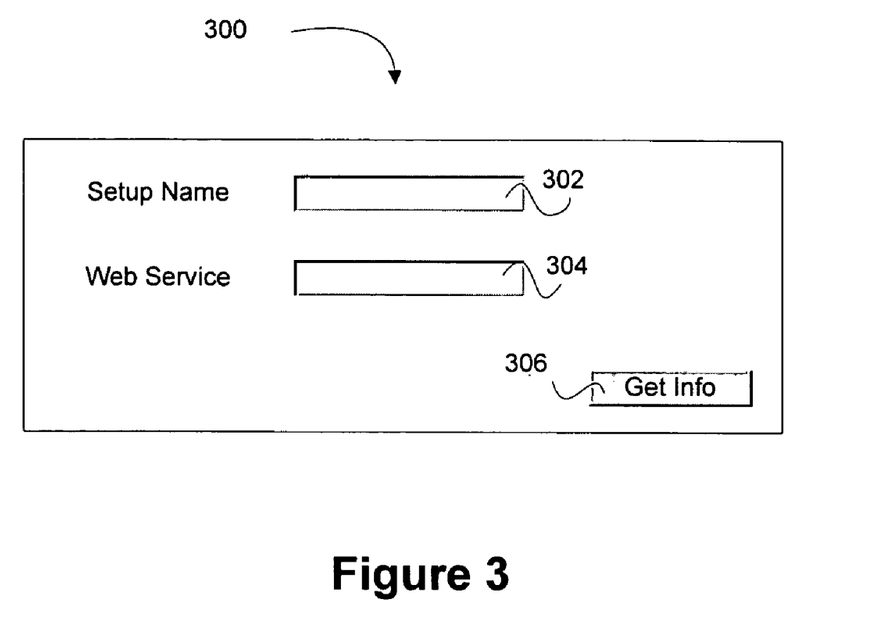
FIG. 3 is an exemplary user interface that may be used to create setup information for a web service.
Figure 4:
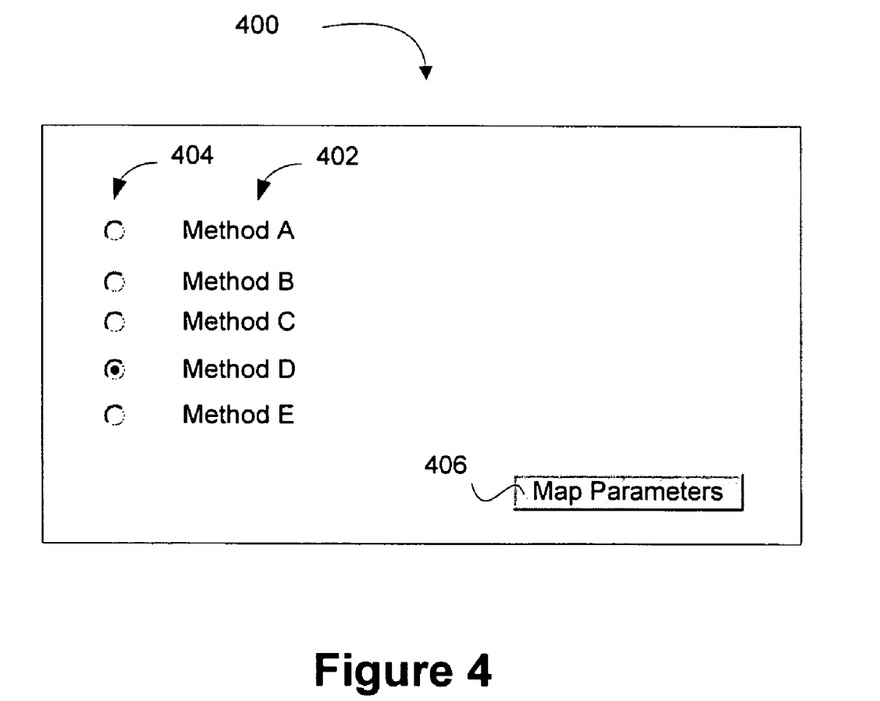
FIG. 4 is an exemplary user interface that may be used to display operations provided by a web service.
Figure 5:
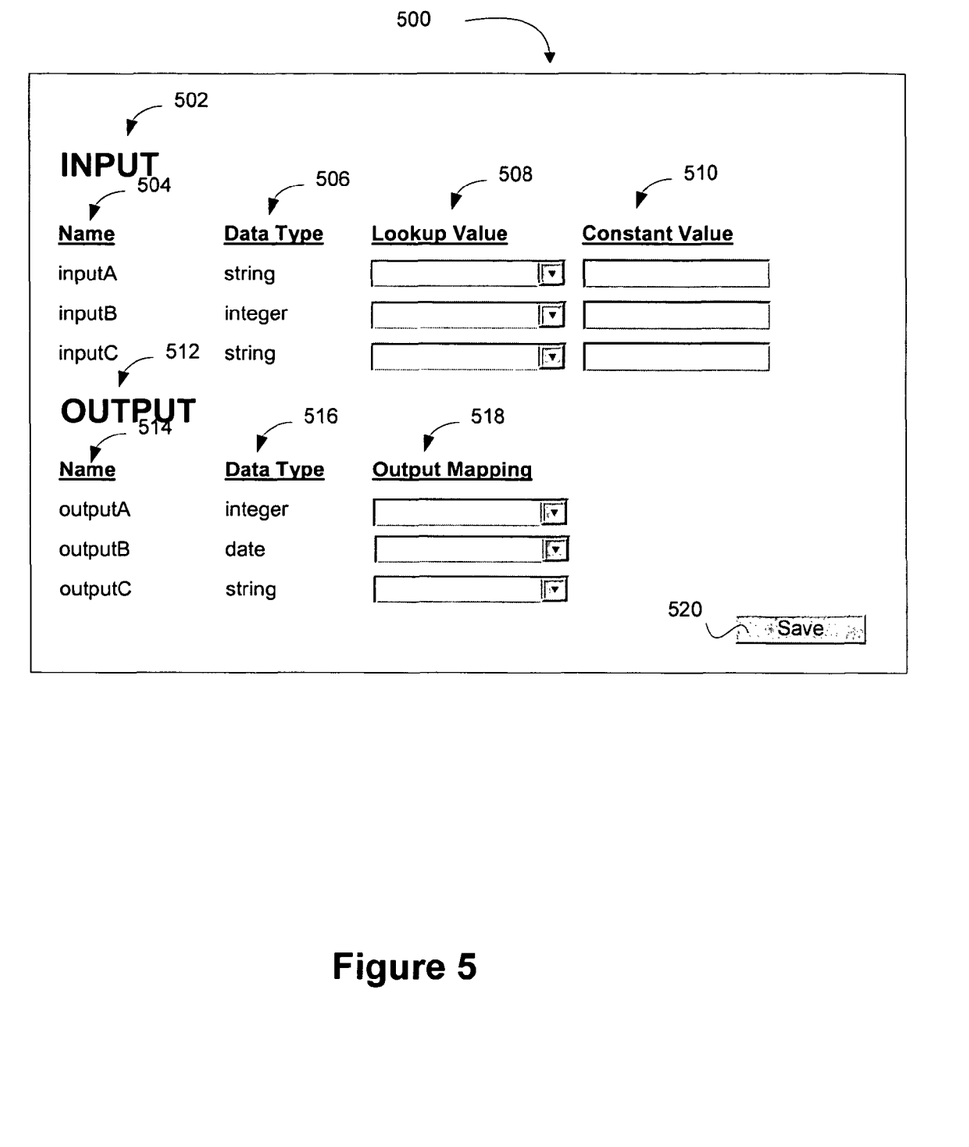
FIG. 5 is an exemplary user interface that may be used to map parameters used by a web service to application data parameters.

FIGS. 3-5 illustrate exemplary user displays that may be displayed by a user interface to allow a user to create setup information to integrate a web service with an application. The user displays illustrated may be presented alone, or in combination with other displays or information. In FIG. 3, a display 300 is illustrated which may be used to obtain basic information used to integrate a web service with an application. A first area 302 is provided for the user to enter a name to associate with setup information which may be later used for invocation of the web service or reconfiguring previously created setup information. A second area 304 is provided for the user to enter the location of the web service (e.g., a URL) to integrate with an application. A mechanism 306, such as a button, is also provided to initiate obtaining the web service description and parsing of the description into information that may be presented to the user.

In alternative embodiments, display 300 may not include an area 302 for the user to enter a setup name, as a setup name may not be used or may be generated by the web services connector. Display 300 may also include other areas, such as an area to enter an application name to be integrated with the web service. Further changes are also contemplated.

FIG. 4 illustrates an exemplary display 400 that may be used to display the operations provided by a web service. A first area 402, such as a column, may be used to display the operations. Mechanisms 404 (e.g., radio button, check-box) for each of the operations are also displayed. These mechanisms 404 may allow the user to select which operations to integrate with the application. Another mechanism 406, such as a button, may be used to present a display, such as the display described below with reference to FIG. 5, to map parameters for a selected operation or operations to application data parameters. Alternative embodiments may include additional, fewer, or alternative components than that shown in display 400.

FIG. 5 illustrates an exemplary display 500 that may be used to map parameters used by a web service operation to application data parameters. A first area 502 may be provided to map input parameters. The first area 502 includes a column 504 listing each of the input parameters used by the web service operation. A second column 506 may be displayed to indicate the data type (e.g., string, data, integer) for each of the input parameters.

The input area 502 also includes a third column 508. Column 508 may display areas, such as combination boxes, list boxes or text boxes, to allow the user to enter an application data input parameter to map to the web service input parameter displayed in column 506. In one embodiment, combination boxes or other type of display mechanisms, are provided to display the application input parameters able to be mapped to the associated web service input parameter. The application input data parameters may have been retrieved by web service connector from a data store associated with the application (e.g., application database tables), may have been entered by a user, or otherwise provided to the web services connector.

In some cases, the user may want to map an input parameter to a constant value that is always used to invoke the web service operation. Thus, a column 510 is provided that includes areas (e.g., text boxes) for each of the web service operation input parameter for a user to enter a constant value for the parameter.

A second area 512 of the display 500 may be used to map output parameters. Area 512 includes a column 514 to display output parameters for the web service operation and a column 516 to display the data type of each of the output parameters. Column 508 may display areas, such as combination boxes, list boxes or text boxes, to allow the user to enter an application data output parameter to map to the web service output parameter displayed in column 514. In some embodiments, mechanisms to display application parameters able to be mapped to the web service output parameter may also be provided.

It should be appreciated that alternative embodiments may not include all of the components described in FIG. 5. For example, in some embodiments, columns 508, 518 may not include mechanisms to allow the user to display application data options able to be mapped to web service parameters. As another example, the display 500 may not include a column 510 to provide for mapping of input parameters to a constant value. Other changes, such as the layout of the display 500, may also be made.

Figure 6:
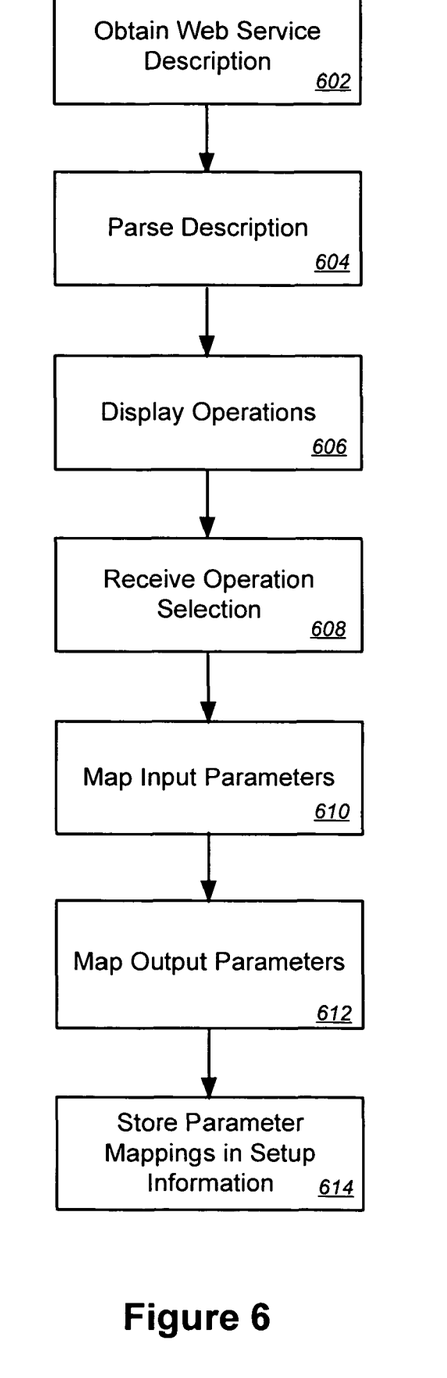
FIG. 6 is an exemplary method that may be used to create setup information for a web service operation.

FIG. 6 illustrates an exemplary method that may be create setup information to integrate a web service with an application. The method may begin by obtaining 602 a description of the web service (e.g., a WSDL document). The description may be parsed 604 to determine the operations provided by the web service.

The operations may then be displayed 606 in a user interface. A user selection of an operation to integrate may then be received 608. One or more of the input parameters associated with the operation are then mapped 610 to application data input parameters and/or to constant values. Output parameters associated with the operation may also be mapped 610 to application data output parameters. The input/output parameters associated with the operation may be determined when the description is parsed 604 to determine associated operations, the description may be parsed multiple times, or another process may be used to determine input/output parameters associated with the selected operation.

In one embodiment, the input and/or output parameters may be mapped by a user using a user interface. The input/output parameters are thus displayed in the user interface. Selection(s) may be received from the user to associate an input parameter with an application data input parameter and/or to associate an output parameter with an application data output parameter. In some embodiments, one or more selections(s) may also or alternatively be received to map input parameter(s) to a constant value(s). It should be appreciated that one or more of the input parameters may not be required to invoke the web service operation, and thus not all of the input parameters may be mapped 610. It should also be appreciated that the application may not use all of the output parameters returned by the web service, and thus not all of the output parameters may be mapped 612.

The input parameter and output parameter mappings created in 610, 612 may then be stored 614 in setup information. By way of example, setup information may be stored in a file, a database, or other type of data storage. Setup information may be used to invoke the operation either by the application itself or by the web service connector invoking the operation on behalf of the application.

In alternative embodiments, changes may be made to the method described above. For example, another process may be used to determine operations associated with a web service or to determine an operation to be integrated. As another example, multiple operations may be integrated with the web service and parameters may then be mapped 610, 612 for all the operations to be integrated with the web service. Other variations may also be made.

Figure 7:
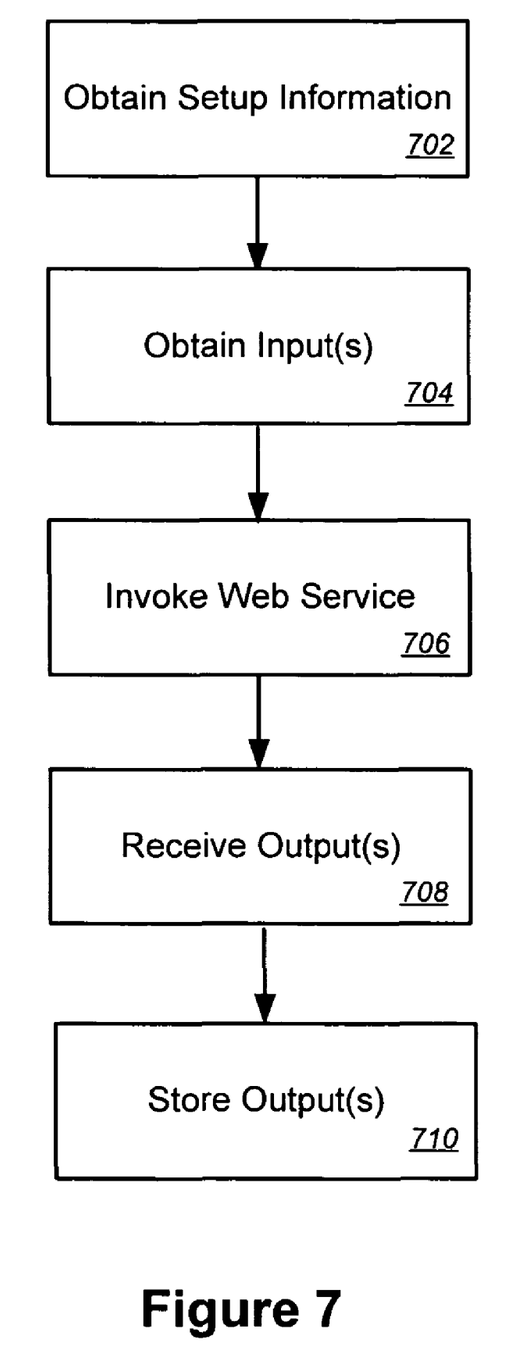
FIG. 7 is an exemplary method that may be used to execute a web service using stored setup information.

An exemplary method that may be used to invoke a web service is illustrated in FIG. 7. As previously described the web service may be invoked by web service connector on behalf of an application or by the application. At the request of the application or by the application itself, setup information used to invoke a web service operation is obtained 702. The setup information may be obtained from a database, a file, or other location.

The obtained setup information may be used to determine mappings between input/output parameters and application data input parameters. Values for the application data inputs mapped to the web service operation inputs are obtained 704. These values may be obtained in a variety of ways. For example, the values may be retrieved from locations associated with the parameters. By way of example, the locations may be fields in a database record, memory locations, or other data structure location. In embodiments in which the web service connector invokes the web service, the locations of the input parameters may be sent to the web service connector by the application. As another example, the values for the parameters may be received from the application.

The web service may then be invoked 706 using the obtained 704 input values. In some embodiments, the web service may be invoked 706 by transmitting XML communications, such as SOAP messages to the web service. Other communication protocols may also be used.

As a result of the execution, one or more outputs may be received 708 from the web service. The setup information may be examined to determine the mapping between the output values and application data output parameters. In embodiments in which the web service connector invoked the web service, location values (e.g., database field, memory location) for each of the mapped application data output parameters may have been received by web service connector from application. The output parameters may then be stored 710 (either by web service connector or the application) in the location value associated with the respective output parameter. Alternatively, in some embodiments the output parameters may not be stored but may be returned to the application by web services connector or further processed by the application. Other changes may also be made to the method described above.

Figure 8:
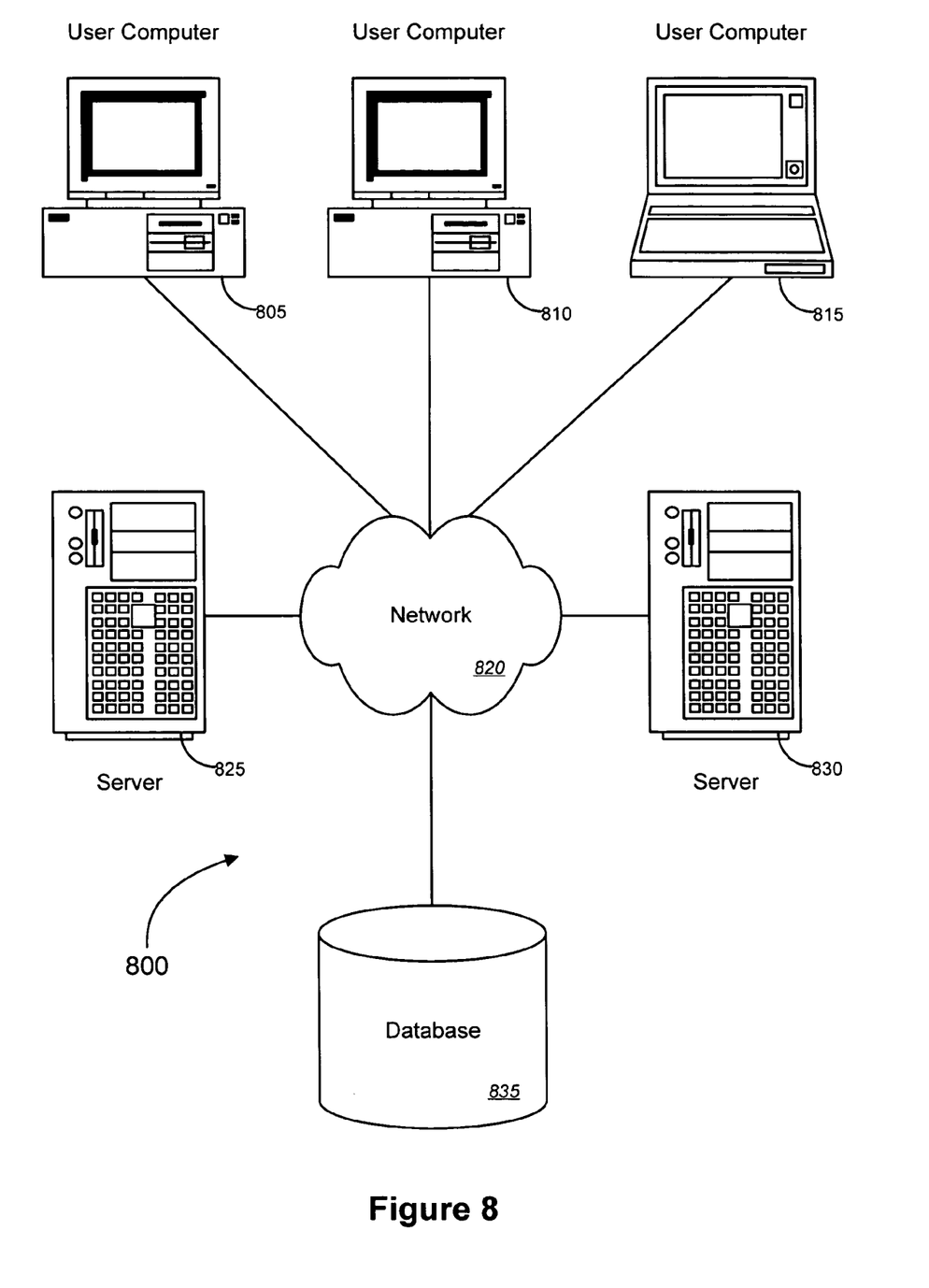
FIG. 8 is an exemplary computer network system that may use a web service connector.

FIG. 8 illustrates a block diagram of a system 800 that may use a web service connector to integrate an application with a web service. The system 800 includes one or more user computers 805, 810, and 815. The user computers 805, 810, and 815 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 805, 810, 815 may also have any of a variety of applications, including for example, database client and/or server applications, and web browser applications. Alternatively, the user computers 805, 810, and 815 may be any other electronic device, such as a thin-client computer, Internet-enabled mobile telephone, and/or personal digital assistant, capable of communicating via a network (e.g., the network 120 described below) and/or displaying and navigating web pages or other types of electronic documents. Although the exemplary system 800 is shown with three user computers, any number of user computers may be supported.

System 800 further includes a network 820. The network 820 may can be any type of network familiar to those skilled in the art that can support data communications using any of a variety of commercially-available protocols, including without limitation TCP/IP, SNA, IPX, AppleTalk, and the like. Merely by way of example, the network 820 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 825, 830. One server may be a web server 825, which may be used to process requests for web pages or other electronic documents from user computers 805, 810, and 820. The web server can be running an operating system including any of those discussed above, as well as any commercially-available server operating systems. The web server 825 can also run a variety of server applications, including HTTP servers, FTP servers, CGI servers, database servers, Java servers, and the like. In some instances, the web server 825 may publish operations available operations as one or more web services.

The system 800 may also include one ore more file and or/application servers 830, which can, in addition to an operating system, include one or more applications accessible by a client running on one or more of the user computers 805, 810, 815. The server(s) 830 may be one or more general purpose computers capable of executing programs or scripts in response to the user computers 805, 810 and 815. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 830 may also include database servers, including without limitation those commercially available from Oracle, Microsoft, Sybase™, IBM™ and the like, which can process requests from database clients running on a user computer 805.

In some embodiments, an application server 830 may create web pages dynamically for displaying the development system. The web pages created by the web application server 830 may be forwarded to a user computer 805 via a web server 825. Similarly, the web server 825 may be able to receive web page requests, web services invocations, and/or input data from a user computer 805 and can forward the web page requests and/or input data to the web application server 830.

In further embodiments, the server 830 may function as a file server. Although for ease of description, FIG. 1 illustrates a separate web server 825 and file/application server 830, those skilled in the art will recognize that the functions described with respect to servers 825, 830 may be performed by a single server and/or a plurality of specialized servers, depending on implementation-specific needs and parameters.

The system 800 may also include a database 835. The database 835 may reside in a variety of locations. By way of example, database 835 may reside on a storage medium local to (and/or resident in) one or more of the computers 805, 810, 815, 825, 830. Alternatively, it may be remote from any or all of the computers 805, 810, 815, 825, 830, and in communication (e.g., via the network 820) with one or more of these. In a particular set of embodiments, the database 835 may reside in a storage-area network ("SAN") familiar to those skilled in the art. Similarly, any necessary files for performing the functions attributed to the computers 805, 810, 815, 825, 830 may be stored locally on the respective computer and/or remotely, as appropriate. In one set of embodiments, the database 835 may be a relational database, such as Oracle 10i™, that is adapted to store, update, and retrieve data in response to SQL-formatted commands.

Figure 9:
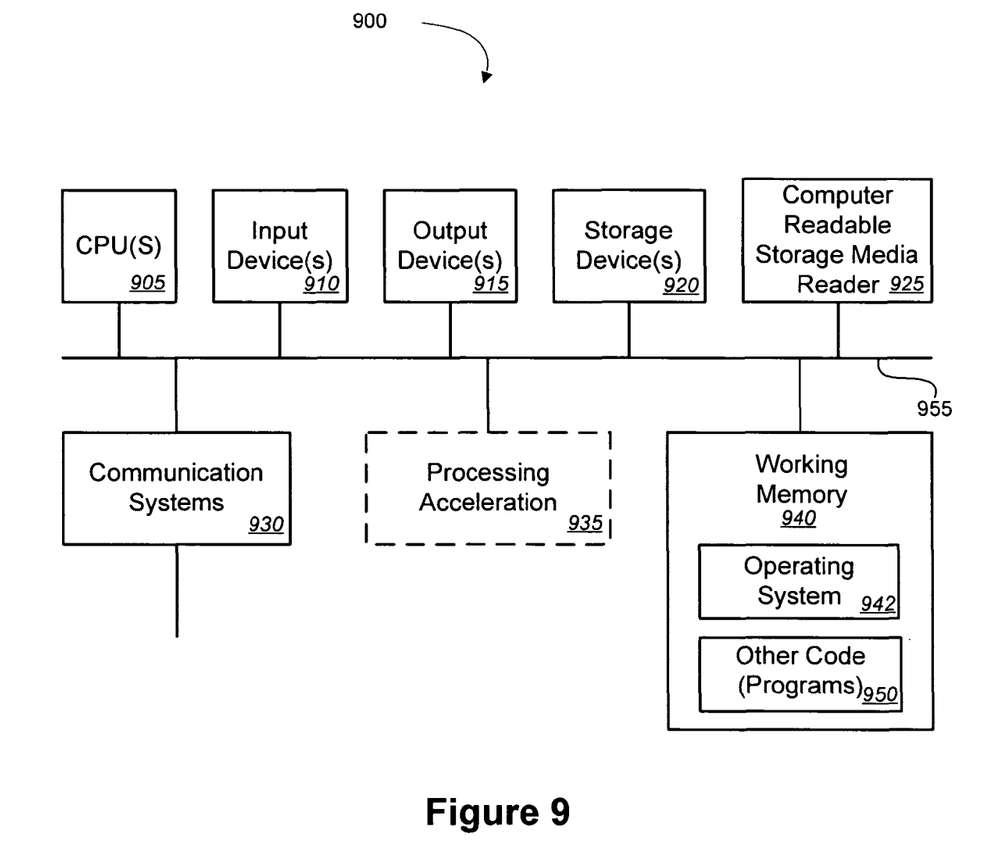
FIG. 9 is a block diagram of a computer system upon which a web service connector may be implemented.

FIG. 9 illustrates one embodiment of a computer system 900 upon which a web service connector or components of a web service connector may be deployed or executed. The computer system 900 is shown comprising hardware elements that may be electrically coupled via a bus 955. The hardware elements may include one or more central processing units (CPUs) 905; one or more input devices 910 (e.g., a mouse, a keyboard, etc.); and one or more output devices 915 (e.g., a display device, a printer, etc.). The computer system 900 may also include one or more storage device 920. By way of example, storage device(s) 920 may be disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 925; a communications system 930 (e.g., a modem, a network card (wireless or wired), an infra-red communication device, etc.); and working memory 940, which may include RAM and ROM devices as described above. In some embodiments, the computer system 900 may also include a processing acceleration unit 935, which can include a DSP, a special-purpose processor and/or the like The computer-readable storage media reader 925 can further be connected to a computer-readable storage medium, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with the network 920 and/or any other computer described above with respect to the system 900.

The computer system 900 may also comprise software elements, shown as being currently located within a working memory 940, including an operating system 945 and/or other code 950, such as program code implementing a web service connector or components of a web service connector. It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method executed with a computer system having a processor and memory, the method comprising:
the computer system determining an operation provided by a first web service of a plurality of web services, wherein each of the plurality of web services is invoked through a different interface, each interface having one or more input parameters used by the web service to invoke the operation and one or more output parameters used by the web service to return results of the operation;

the computer system determining the input parameters associated with the operation;

the computer system mapping at least one of the input parameter parameters to an application input data parameter associated with an application, wherein mapping the input parameter to the application input data parameter comprises displaying the input parameter in a user display, providing in the user display a set of application parameters able to be mapped to the input parameter,-and receiving through the user interface a selection of one of the input parameter to parameters and the application input data parameter, and associating the selected input parameter and the application input data parameter based on the selection;

the computer system determining the output parameters associated with the operation;

the computer system mapping at least one or the output parameter parameters to an application output data parameter associated with the application, wherein mapping the output parameter to the application output data parameter comprises displaying the output parameter in the user display, providing in the user display a set of application parameters able to be mapped to the output parameter, -a-l~receiving through the user interface a selection to of one of the output parameters and the application output data parameter, and associating the selected output parameter and the application output data parameter based on the selection; and the computer system storing the input parameter mapping and the output parameter mapping in setup information used to invoke the operation the computer system determining one or more additional input parameters required by the operation; for each of the one or more additional parameters, mapping the additional input parameter to an application data input; and storing the additional mappings in the setup information.

2. The method of claim 1, wherein determining the operation comprises:

receiving a description of the web service; parsing the description to determine associated operations provided by the web service.

3. The method of claim 2, wherein determining the operation further comprises:

displaying the associated operations in a user interface; and receiving a selection of one of the associated operations from the user.

4. The method of claim 2, wherein the description comprises a Web Services Description Language (WSDL) document.

5. The method of claim 1, further comprising:

determining a second input parameter associated with the operation; mapping the second input parameter to a constant value; and storing the second input parameter mapping in the setup information.

6. The method of claim 1, further comprising receiving at the computer system from the application a request to invoke the operation provided by the first web service.

7. The method of claim 6, further comprising receiving at the computer system from the application a setup identifier identifying the setup information storing the input parameter mapping and the output parameter mapping.

8. The method of claim 6, further comprising determining by the computer system the setup information storing the input parameter mapping and the output parameter mapping based on the application and the request to invoke the operation provided by the first web service.

9. The method of claim 6, further comprising retrieving the setup information storing the input parameter mapping and the output parameter mapping.

10. The method of claim 6, further comprising invoking the operation provided by the first web service based on the setup information.

11. The method of claim 6, further comprising receiving at the computer system from the application locations storing values for the application input parameter and the application output parameter and wherein invoking the operation provided by the first web service further comprises obtaining the value for the application input parameter from the locations and invoking the operation provided by the first web service using the obtained values.

12. The method of claim 6, further comprising receiving at the computer system from the application a value for the application input parameter and wherein invoking the operation provided by the first web service further comprises invoking the operation provided by the first web service using the received values.

13. The method of claim 1 further comprising:

the computer system determining an operation provided by a second web service of the plurality of web services, wherein the operation provided by the second web service is different from the operation provided by the first web service and wherein the interface for invoking the second web service is different from the interface for invoking the second web service;

the computer system determining the input parameters associated with the operation provided by the second web service;

the computer system mapping at least one of the input parameter parameters to an application input data parameter associated with the application, wherein mapping the input parameter to the application input data parameter comprises displaying the input parameter in a user display, providing in the user display a set of application parameters able to be mapped to the input parameter, and receiving through the user interface a selection to of one of the input parameters and the application input data parameter, and associating the selected input parameter and the application input data parameter based on the selection;

the computer system determining the output parameters associated with the operation;

the computer system mapping at least one or the output parameter parameters to an application output data parameter associated with the application, wherein mapping the output parameter to the application output data parameter comprises displaying the output parameter in the user display, providing in the user display a set of application parameters able to be mapped to the output parameter, and receiving through the user interface a selection to of one of the output parameters and the application output data parameter, and associating the selected output parameter and the application output data parameter based on the selection; and the computer system storing the input parameter mapping and the output parameter mapping in setup information used to invoke the operation provided by the second web service the computer system determining one or more additional input parameters required by the operation; for each of the one or more additional parameters, mapping the additional input parameter to an application data input; and storing the additional mappings in the setup information.

14. The method of claim 13, further comprising: the computer system determining a changed input parameter associated with the operation;

the computer system mapping the changed input parameter to the application input data parameter associated with the application wherein mapping the changed input parameter to the application input data parameter comprises displaying the changed input parameter in the user display, providing in the user display the set of application parameters able to be mapped to the input parameter, and receiving through the user interface a selection of the changed input parameter, and an application input data parameter: and associating the changed input parameter and the selected application input data parameter based on the selection; the computer system determining a changed output parameter associated with the operation;

the computer system mapping the changed output parameter to the application output data parameter associated with the application, wherein mapping the changed output parameter to the application output data parameter comprises displaying the changed output parameter in the user display, providing in the user display a set of application parameters able to be mapped to the changed output parameter, receiving through the user interface a selection of the changed output parameter, and an application output data parameter, and associating the changed output parameter and the selected application output data parameter based on the selection; and the computer system storing the input parameter mapping and the output parameter mapping in setup information used to invoke the operation.

15. A system comprising: a processor; and a memory communicatively coupled with and readable by the processor and having stored therein a sequence of instructions which, when executed by the processor, cause the processor to provide integration to a plurality of web services by:

determining an operation provided by a first web service of the plurality of web services, wherein each of the plurality of web services is invoked through a different interface, each interface having one or more input parameters used by the web service to invoke the operation and one or more output parameters used by the web service to return results of the operation;

determining the input parameter parameters associated with the operation; mapping at least one of the input parameters to an application input data parameter associated with an application, wherein mapping the input parameter to the application input data parameter comprises displaying the input parameter in a user display, providing in the user display a set of application parameters able to be mapped to the input parameter, and receiving through the user interface a selection to of one of the input parameters and the application input data parameter, and associating the selected input parameter and the application input data parameter based on the selection;

determining the output parameter parameters associated with the operation; mapping at least one or the output parameter parameters to an application output data parameter associated with the application, wherein mapping the output parameter to the application output data parameter comprises displaying the output parameter in the user display, providing in the user display a set of application parameters able to be mapped to the output parameter, and receiving through the user interface a selection to of one of the output to parameters and the application output data parameter, and associating the selected output parameter and the application output data parameter based on the selection; and storing the input parameter mapping and the output parameter mapping in setup information used to invoke the operation the computer system determining one or more additional input parameters required by the operation; for each of the one or more additional parameters, mapping the additional input parameter to an application data input; and storing the additional mappings in the setup information.

16. A computer-readable memory device having stored thereon and having stored therein a sequence of instructions which, when executed by a processor, cause the processor to provide integration to a plurality of web services by: determining an operation provided by a first web service of the plurality of web services, wherein each of the plurality of web services is invoked through a different interface~ each interface having one or more input parameters used by the web service to invoke the operation and one or more output parameters used by the web service to return results of the operation;

determining the input parameter parameters associated with the operation; mapping at least one of the input parameters to an application input data parameter associated with an application, wherein mapping the input parameter to the application input data parameter comprises displaying the input parameter in a user display, providing in the user display a set of application parameters able to be mapped to the input parameter, and receiving through the user interface a selection to of one of the input parameters and the application input data parameter, and associating the selected input parameter and the application input data parameter based on the selection;

determining the output parameter parameters associated with the operation;

mapping at least one or the output parameter parameters to an application output data parameter associated with the application, wherein mapping the output parameter to the application output data parameter comprises displaying the output parameter in the user display, providing in the user display a set of application parameters able to be mapped to the output parameter, and receiving through the user interface a selection to of one of the output parameters and the application output data parameter, and associating the selected output parameter and the application output data parameter based on the selection; and storing the input parameter mapping and the output parameter mapping in setup information used to invoke the operation the computer system determining one or more additional input parameters required by the operation; for each of the one or more additional parameters, mapping the additional input parameter to an application data input; and storing the additional mappings in the setup information.

* * * * *

UNITED STATES PATENT AND TRADEMARK OFFICE
CERTIFICATE OF CORRECTION

PATENT NO. : 8,321,535 B2
APPLICATION NO. : 10/993893
DATED : November 27, 2012
INVENTOR(S) : Desai et al.

It is certified that error appears in the above-identified patent and that said Letters Patent is hereby corrected as shown below:

In column 9, line 8, delete "one ore more" and insert -- one or more --, therefor.

In column 10, line 13, delete "like" and insert -- like. --, therefor.

In column 11, line 7, in claim 1, delete "parameter parameters" and insert -- parameters --, therefor.

In column 11, line 12-13, in Claim 1, delete "parameter,-and" and insert -- parameter, --, therefor.

In column 11, line 14, in Claim 1, delete "parameter to parameters" and insert -- parameters --, therefor.

In column 11, line 21, in Claim 1, delete "parameter parameters" and insert -- parameters --, therefor.

In column 11, line 27, in Claim 1, delete "-a-l~receiving" and insert -- receiving --, therefor.

In column 11, line 28, in Claim 1, delete "to of one" and insert -- of one --, therefor.

In column 12, line 7, in Claim 10, delete "claim 6," and insert -- claim 9, --, therefor.

In column 12, line 10, in Claim 11, delete "claim 6," and insert -- claim 10, --, therefor.

In column 12, line 18, in Claim 12, delete "claim 6," and insert -- claim 10, --, therefor.

In column 12, line 36, in Claim 13, delete "parameter parameters" and insert -- parameters --, therefor.

In column 12, line 41-42, in Claim 13, delete "parameter, and" and insert -- parameter, --, therefor.

In column 12, line 43, in Claim 13, delete "to of one" and insert -- of one --, therefor.

In column 12, line 50, in Claim 13, delete "parameter parameters" and insert -- parameters --, therefor.

In column 12, line 56, in Claim 13, delete "parameter, and" and insert -- parameter, --, therefor.

In column 12, line 57, in Claim 13, delete "to of one" and insert -- of one --, therefor.

In column 13, line 13-14, in Claim 14, delete "parameter, and" and insert -- parameter, --, therefor.

In column 13, line 15, in Claim 14, delete "parameter," and insert -- parameter --, therefor.

In column 13, line 16, in Claim 14, delete "parameter: and" and insert -- parameter, and --, therefor.

In column 13, line 29, in Claim 14, delete "parameter, and" and insert -- parameter and --, therefor.

In column 13, line 48, in Claim 15, delete "parameter parameters" and insert -- parameters --, therefor.

Signed and Sealed this
Nineteenth Day of March, 2013

Teresa Stanek Rea
*Acting Director of the United States Patent and Trademark Office*

CERTIFICATE OF CORRECTION (continued)
U.S. Pat. No. 8,321,535 B2

In column 13, line 55, in Claim 15, delete "parameter, and" and insert -- parameter, --, therefor.

In column 13, line 56, in Claim 15, delete "to of one" and insert -- of one --, therefor.

In column 13, line 61, in Claim 15, delete "parameter parameters" and insert -- parameters --, therefor.

In column 13, line 63, in Claim 15, delete "parameter parameters" and insert -- parameters --, therefor.

In column 14, line 4, in Claim 15, delete "parameter, and" and insert -- parameter, --, therefor.

In column 14, line 5, in Claim 15, delete "to of one" and insert -- of one --, therefor.

In column 14, line 5, in Claim 15, delete "output to" and insert -- output --, therefor.

In column 14, line 24, in Claim 16, delete "interface~each" and insert -- interface, each --, therefor.

In column 14, line 28, in Claim 16, delete "parameter parameters" and insert -- parameters --, therefor.

In column 14, line 35, in Claim 16, delete "parameter, and" and insert -- parameter, --, therefor.

In column 14, line 36, in Claim 16, delete "to of one" and insert -- of one --, therefor.

In column 14, line 41, in Claim 16, delete "parameter parameters" and insert -- parameters --, therefor.

In column 14, line 43, in Claim 16, delete "parameter parameters" and insert -- parameters --, therefor.

In column 14, line 49, in Claim 16, delete "parameter, and" and insert -- parameter, --, therefor.

In column 14, line 50, in Claim 16, delete "to of one" and insert -- of one --, therefor.